United States Patent [19]

Kikuchi et al.

[11] Patent Number: 4,817,075
[45] Date of Patent: Mar. 28, 1989

[54] PROGRAM SELECTION FOR A DIGITAL AUDIO DISK

[75] Inventors: Takashi Kikuchi; Naomi Amemiya; Masami Tsuchida; Shiro Suzuki; Masashi Tanabe, all of Saitama, Japan

[73] Assignee: Pioneer Electronic Corporation, Tokyo, Japan

[21] Appl. No.: 21,877

[22] Filed: Mar. 4, 1987

[30] Foreign Application Priority Data

Mar. 4, 1986 [JP] Japan .................................. 61-48131
Mar. 8, 1986 [JP] Japan .................................. 61-50881

[51] Int. Cl.⁴ ........................ G11B 17/00; G11B 27/08
[52] U.S. Cl. ........................................ 369/47; 360/15; 360/72.2; 369/14; 369/33; 369/41
[58] Field of Search .................... 360/18, 72.2, 15, 13, 360/32; 369/15, 14, 30, 32, 33, 41, 59, 49, 47

[56] References Cited

U.S. PATENT DOCUMENTS 3,906,169 9/1975 Iwase ..................................... 360/15
3,990,710 11/1976 Hughes ................................. 360/15
4,206,483 6/1980 Nakamura .......................... 360/33.1
4,752,920 6/1988 d'Alayer ............................... 369/33

OTHER PUBLICATIONS

Philips Tech. Rev. 40, 1982, No. 6, p. 165.

Primary Examiner—Steven L. Stephan
Attorney, Agent, or Firm—Sughrue, Mion, Zinn, Macpeak & Seas

[57] ABSTRACT

A digital audio player in which the pieces of music are played according to a program. The program is selected so that the total playing time does not exceed a set period of time. The selection is performed by reading playing times from a disk on which are recorded both the pieces of music and their separate playing times.

23 Claims, 6 Drawing Sheets

PROGRAM SELECTION FOR A DIGITAL AUDIO DISK

BACKGROUND OF THE INVENTION

1. Field of the Invention

The present invention relates to a digital audio disk reproducing apparatus and method, and, in particular, to an apparatus and method for reproducing recorded information from digital audio disks generally referred to as compact disks.

2. Background of the Invention

The recording area of a digital audio disk (also called a compact disk) is shown in FIG. 1 and consists of three portions arranged, from the center outward, in the order of a lead-in area E1, a program area E2 and a leadout area E3. A data group called TOC (table of contents) is recorded in the lead-in area E1 and the TOC contains data specifying various factors including addresses (positions on the disk) for the number of pieces of music recorded thereon and the intermusic portions, as well as the playing time required to reproduce each piece of music, and the total playing time. The program area E2 adjacent the lead-in area E1 contains audio information which will be replayed. The lead-out area E3 contains repeated signals for indicating the ending of the audio information of the program area E2.

Information recorded on a digital audio disk is reproduced with a digital audio disk player (hereinafter referred to simply as a player) either sequentially (i.e., all pieces of music recorded are reproduced in the order they have been recorded) or in a selective fashion (only designated pieces of music are reproduced).

A player having a capability for random memory music selection or program music selection has already been developed for use as an apparatus for reproducing the pieces of music recorded in the digital disk. This player is so designed that it automatically reproduces successive pieces of music in response to the addressing of their music numbers by manual operation on an input device such as a keyboard. There sometimes occurs the need to reproduce with this player the pieces of music recorded in a digital audio disk and to dub (or copy) them onto magnetic tape. The time required to reproduce all of the recorded pieces of music is not necessarily equal to the time over which recording is possible with the tape. Therefore, it is possible that the piece of music being replayed after dubbing will be interrupted or a prolonged blank period will occur at the end of the tape to cause discomfort to the listener. In order to ensure that none of the pieces of music dubbed onto magnetic tape will be interrupted during replay, the user who is dubbing must first check the recordability of pieces of music in consideration of the tape length and the total playing time of the pieces of music to be dubbed and then to make use of the random memory music selection capability of the player to designate the pieces of music that can be dubbed and properly reproduced from the tape. However, complicated procedures are necessary to attain this object with the conventional player.

SUMMARY OF THE INVENTION

Therefore, an object of the present invention is to provide a digital audio disk reproducing apparatus and method that automatically achieves desired dubbing without complicated procedures.

The digital audio disk reproducing apparatus and method of the present invention is so designed that, in response to a programming command (a reproduction instruction for reproducing), each of the combinations of pieces of information that can be reproduced within a designated period of time is determined on the basis of the time information recorded on the disk and is then written into a memory.

DETAILED DESCRIPTION OF THE PREFERRED EMBODIMENTS

Embodiments of the present invention are hereinafter described with reference to the accompanying drawings.

Figure 2:
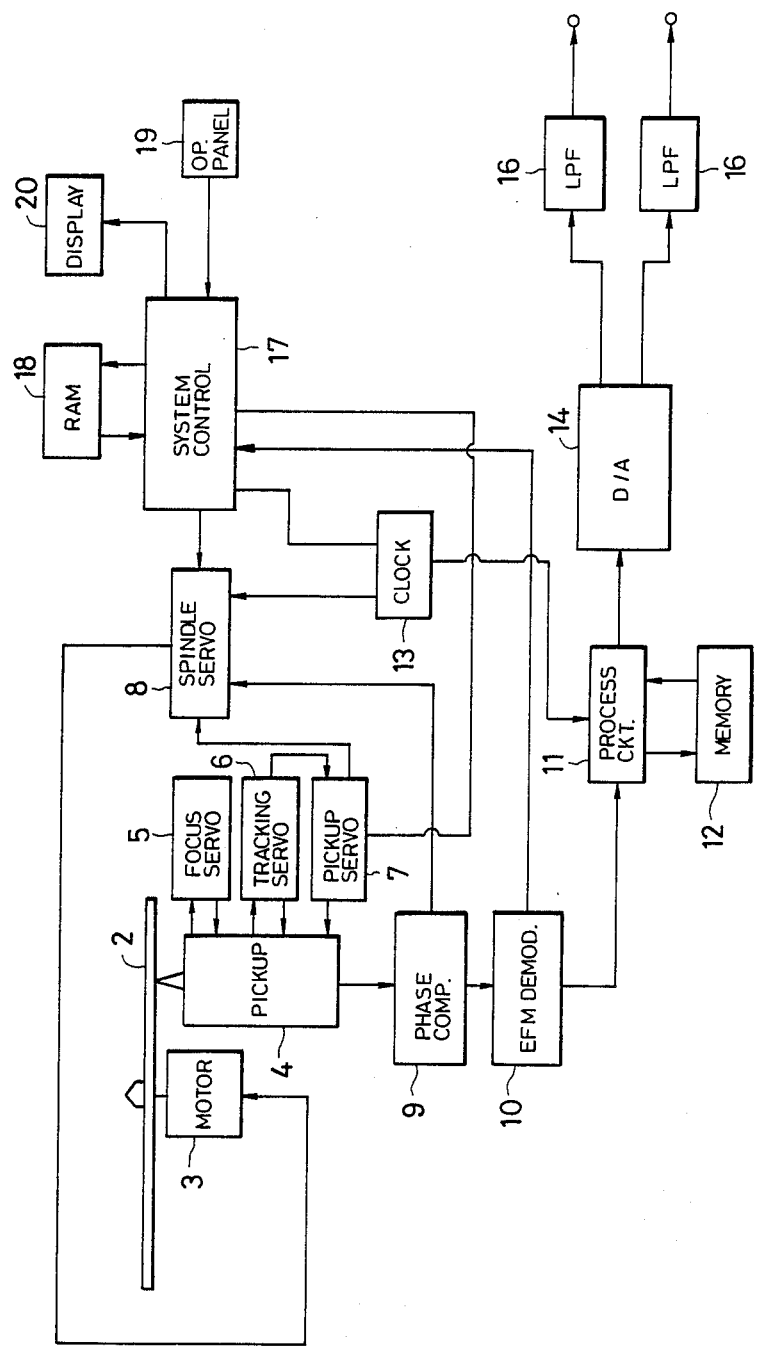
FIG. 2 is a block diagram showing a digital audio disk reproducing apparatus according to one embodiment of the present invention.

FIG. 2 is a block diagram of a digital audio disk reproducing apparatus according to one embodiment of the present invention. As shown, the information recorded in a digital audio disk 2 that is driven to rotate with a spindle motor 3 is read out of the disk with an optical pickup 4. The pickup 4 contains in its interior a laser diode, an objective lens, a focus actuator, a tracking actuator, a photodetector, etc. The output of the pickup 4 is supplied to the inputs of a focus servo circuit 5, a tracking servo circuit 6, and a phase comparator circuit 9 including a RF amplifier. A focus error is produced by the focus servo circuit 5 and the focus actuator in the pickup 4 is driven in accordance with the amount of this error. A tracking error is produced in the tracking servo circuit 6 and this error component is sent to both the tracking actuator in the pickup 4 and a pickup move servo circuit 7. In response to the output of this pickup move servo circuit 7, the pickup 4 is moved in the radial direction of the disk 2.

The phase comparator circuit 9 produces a reproduction clock signal. The phase difference between the reproduction clock signal and the reference clock signal from a clock generator circuit 13 is detected by a spindle servo circuit 8, which controls the spindle motor 3 to be driven in such a way that the linear speed of the tracks on the recording disk 2 will be held constant. The output of the phase comparator circuit 9 is also supplied to an EFM (eight to fourteen modulation) demodulator circuit 10 including a frame synchronizing circuit. The demodulation output is processed in a data processing circuit 11 which performs various operations on the demodulated data signal, such as de-interleaving, error detection, correction, and various other modifications. The processed data is temporarily stored in a data memory 12 before it is read out in response to a clock signal that is issued at a predetermined period from the clock generator circuit 13. The read data is converted into an analog signal in a D/A (digital/analog) converter 14. The output of the D/A converter 14 is passed through LPFs (low-pass filters) 16 to produce a left- and a right-channel audio signals that are supplied at respective output terminals.

Figure 1:
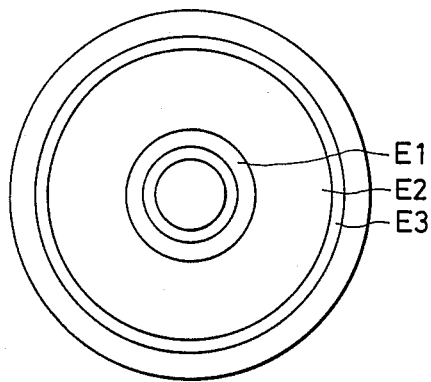
FIG. 1 shows the recording areas of a digital audio disk.
Figure 3:
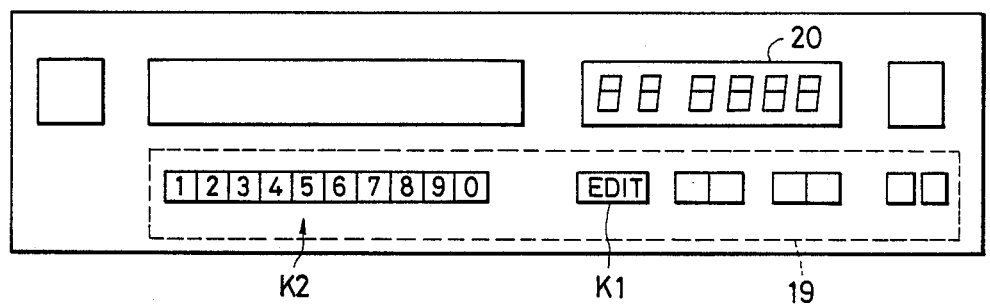
FIG. 3 is a sketch of the operating panel incorporated in the apparatus of FIG. 1.

The data frm the EFM demodulator circuit 10 contains a control signal that is supplied to a system controller 17 which reads the TOC from the lead-in area and other audio information from the program area. Examples of the audio information also include (i) the result of checking as to whether the reproduced signal remains at a low level longer than a predetermined period, (ii) music number, (iii) the playing time of the music being reproduced, and (iv) audio mute. The system controller 17 is composed of one or more units of microcomputers. In response to keying-in on an operating panel 19 and to instruction codes written in the program area of a RAM (random access memory) 18, the system controller 17 supplies data to a display 20 and provides various commands to the pickup move servo circuit 7, the spindle servo circuit 8 and the D/A converter 14. As shown in FIG. 3, the operating panel 19 is provided with an edit key K1 for issuing a programming command and a ten-key pad K2 for designating the duration of reproduction mode and the piece of music to be reproduced. The processor in the microcomputer(s) of which the system controller 17 is composed is operated in accordance with the program stored in a ROM (read-only memory) and performs the following sequence of processing.

Figure 4:
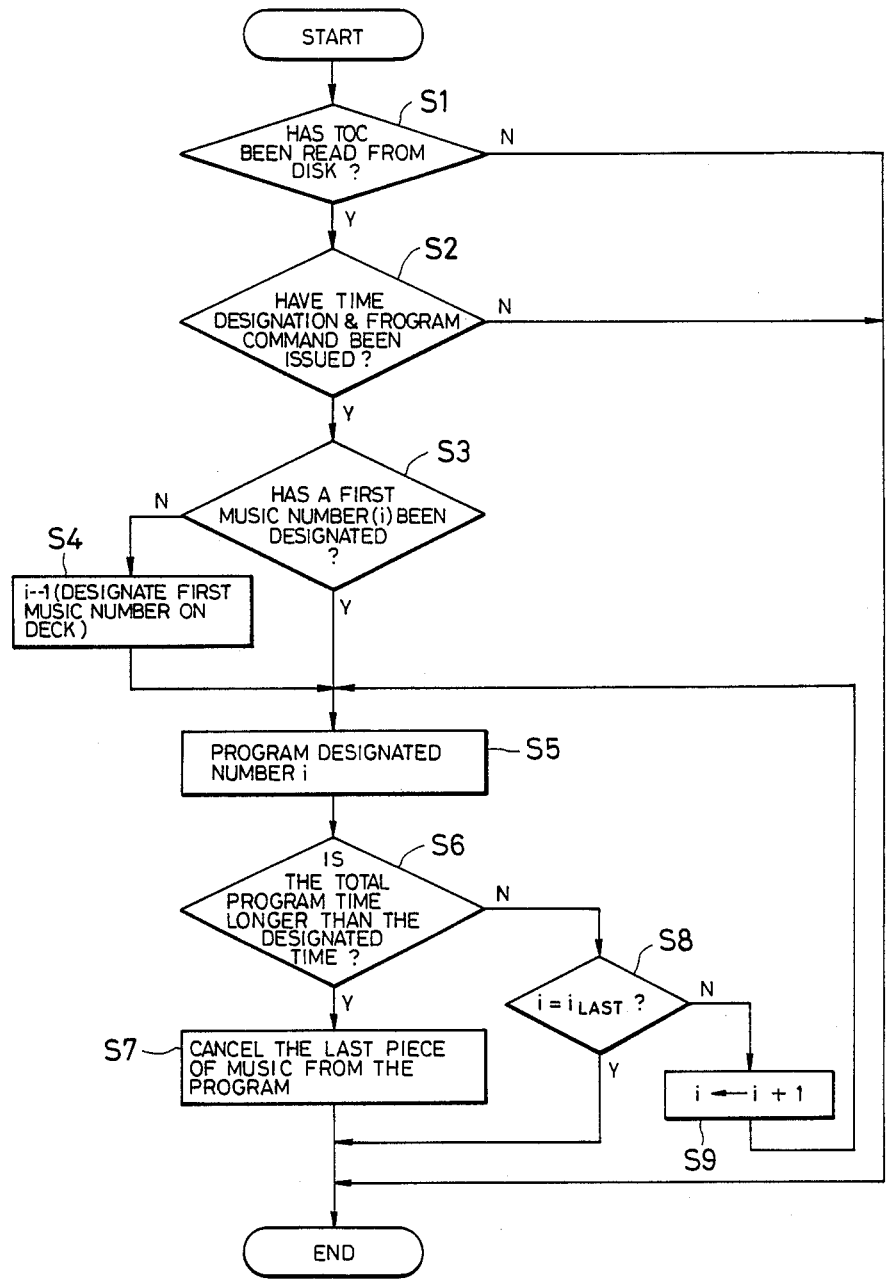
FIG. 4 is a flowchart showing a sequence for operating the system shown in FIG. 1.

If an interrupt request signal is generated by a timer or the like during the execution of a main routine, the processor determines whether the TOC has been read from the lead-in area of the disk 2 to be written into RAM 18 (step S1 in FIG. 4). If it is found that the writing of TOC into RAM has not been completed, the processor resumes the execution of the main routine. If the writing of the TOC into RAM 18 has been completed, the processor determines whether the duration of the reproduction mode has been designated and whether a program command has been issued (step S2).

If the failure to perform one or both of these jobs is found, the processor resumes the execution of the main routine. If it is found that one or both of these jobs have been carried out, the processor determines whether the number of the first piece of music to be reproduced has been designated by the operation on the ten-pad key K2 at a time subsequent, for example, to the designation of the duration of reproduction mode (step S3). If the result is negative, the processor allocates a designation number i=1 to the first piece of music recorded on the disk 2 (S4 in FIG. 3) and writes the number i into the program area of RAM 18 as a code for an instruction that commands the reproduction of the piece of music assigned that number (step S5). If, as a result of execution of step S3, it is found that the music number of the first piece of music to be played has been input as designation number i, the processor immediately executes step S5.

In the next place, the processor determines whether the total duration of the time required to reproduce the piece of music having the designated i that has been written as a code for the instruction for reproduction is longer than the designated duration of the reproduction mode (S6). If the result is positive, the processor erases the last instruction code containing i that has been written into the program area of the RAM 18 (S7) and resumes the execution of the main routine. If the result is negative, that is, the total duration of reproduction time is equal to or shorter than the designated duration of reproduction mode, the processor determines whether the designated music number i that has been written into the program area of RAM 18 is identical to the music number $i_{last}$ of the last music recorded in the disk 2 (step S8). If the result is negative, the processor adds 1 (one) to the designated music number i (step S9) and repeats step S5 and the subsequent sequence. If the result of testing for the end is positive, the processor resumes the execution of the main routine.

As a result of these procedures, a program that provides successive reproduction of the maximum number of pieces of information that can be reproduced within the designated duration of the reproduction mode is automatically written into the program area of RAM 18, to thereby achieve the desired dubbing by a simple operation.

Figure 5:
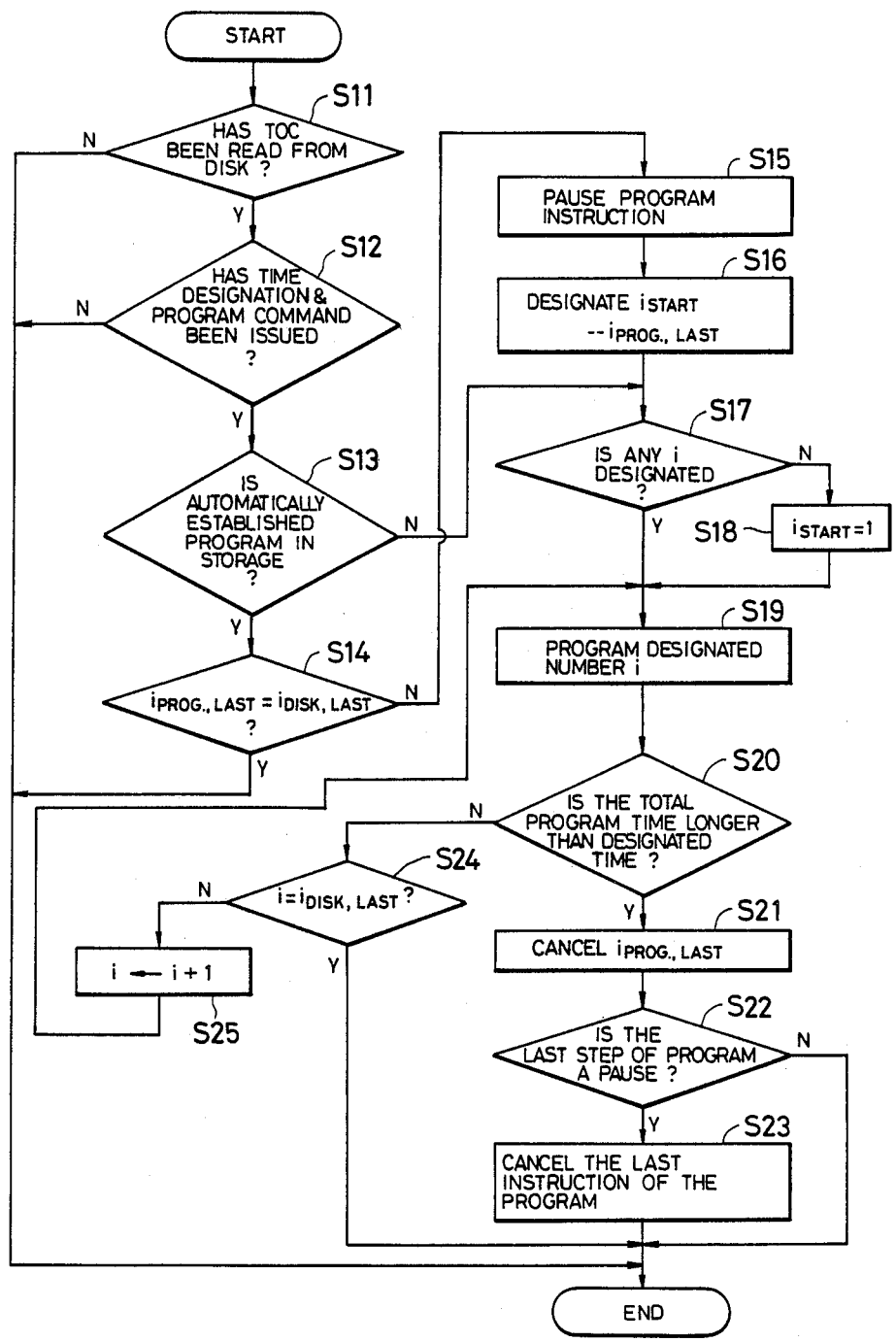
FIG. 5 is a flowchart showing another sequence for operating the system shown in FIG. 1.

FIG. 5 is a flow sheet showing another sequence for operating the system shown in FIG. 2. Since steps S11 and S12 of this sequence are the same as steps S1 and S2 shown in FIG. 4, the following description is directed to step S13 and subsequent steps.

If, as a result of execution of step S12, it is found that the duratio of reproduction mode has been designated and a program command has been issued, the processor determines whether the program that has already been automatically established by a previous execution of the same sequence is stored in the program area (step S13). If the result is positive, the processor determines whether the last instruction code $i_{DISK,\ LAST}$ of the last piece of music recorded in the disk 2 (step S14). If the result is positive, the processor resumes the main routine. If, the result is negative, the processor writes a pause instruction (i.e., a command for the stop of the reproduction mode) at the next address next after the last instruction code of the stored program (step S15). Then, the processor assigns the value to the designation number i of the music number which is next after the one that has been written as the last instruction code of the stored program and stores this music number i as a program starting number $i_1$ in a memory device such as a register (step S16). Subsequently, the processor determines whether the setting of the program starting designated number i has been completed (step S17). If, as a result of step S13, it is found that no program has been stored in the program area, the processor immediately goes to step 17. If, as a result of execution of step S17, it is found that the setting of the starting designated number i has not been completed, the processor assigns to the designation number i the value of the music number of the first piece of music recorded in the disk 2 and stores this music number i in a memory device such as a register (step S18).

This number i is written into the program area as an instruction code (step S19). If the result of the test of step S17 is positive (i.e., the setting of designated number i has been completed), the processor immediately programs the designated i in step S19.

In the next step, the processor determines whether the time required for executing all of the additional instructions written into the program area is longer than the designated duration of the reproduction mode (step S20). If the result is positive, the processor erases the last instruction that was written into the program area so as to cancel the last piece of music from the program (step S21). The processor then determines whether the last additional instruction written into the program area is a pause instruction (step S22). If the result is positive, the processor erases that pause instruction (step S23) and resumes the main routine. If the result is negative (i.e., the last instruction of the program newly stored in the program area is not a pause instruction), the processor immediately resumes the main routine.

If the result of the execution of step S20 is negative (i.e., the time required for executing all of the additional instructions written into the program area is equal to or shorter than the designated duration of the reproduction mode), the processor determines whether the music number written into the program area as the last instruction code is the same as the music number of the last piece of music recorded in the disk 2 (step S24). If the result is positive, the processor resumes the execution of the main routine. If the result is negative, the processor adds 1 (one) to the designation number i stored in the register (step S25) and performs the execution of step S19 and the subsequent sequence of steps.

As a result of these procedures, two programs that permit successive reproduction of the maximum number of pieces of information that can be reproduced within the designated duration of the reproduction mode are formed with a pause instruction being inserted between the two programs. Therefore, information can be dubbed onto each of the two recording areas (surface A and surface B) of a magnetic tape.

As described above, the digital audio disk reproducing apparatus of the first embodiment of the present invention is so designed that, in response to a programming command, a reproduction instruction for reproducing, on the basis of the time information recorded in the disk, each of the combinations of pieces of information that can be reproduced within a designated period of time is written into a memory. No complicated procedures are necessary to ensure that the copying of recorded pieces of music from a digital audio disk onto a magnetic tape is stopped just when the reproduction of a piece of music of interest is completed before the tape has been completely exhausted. As a result, satisfactory dubbing can be accomplished with no piece of music being interrupted in the midst of playing.

Figure 6:
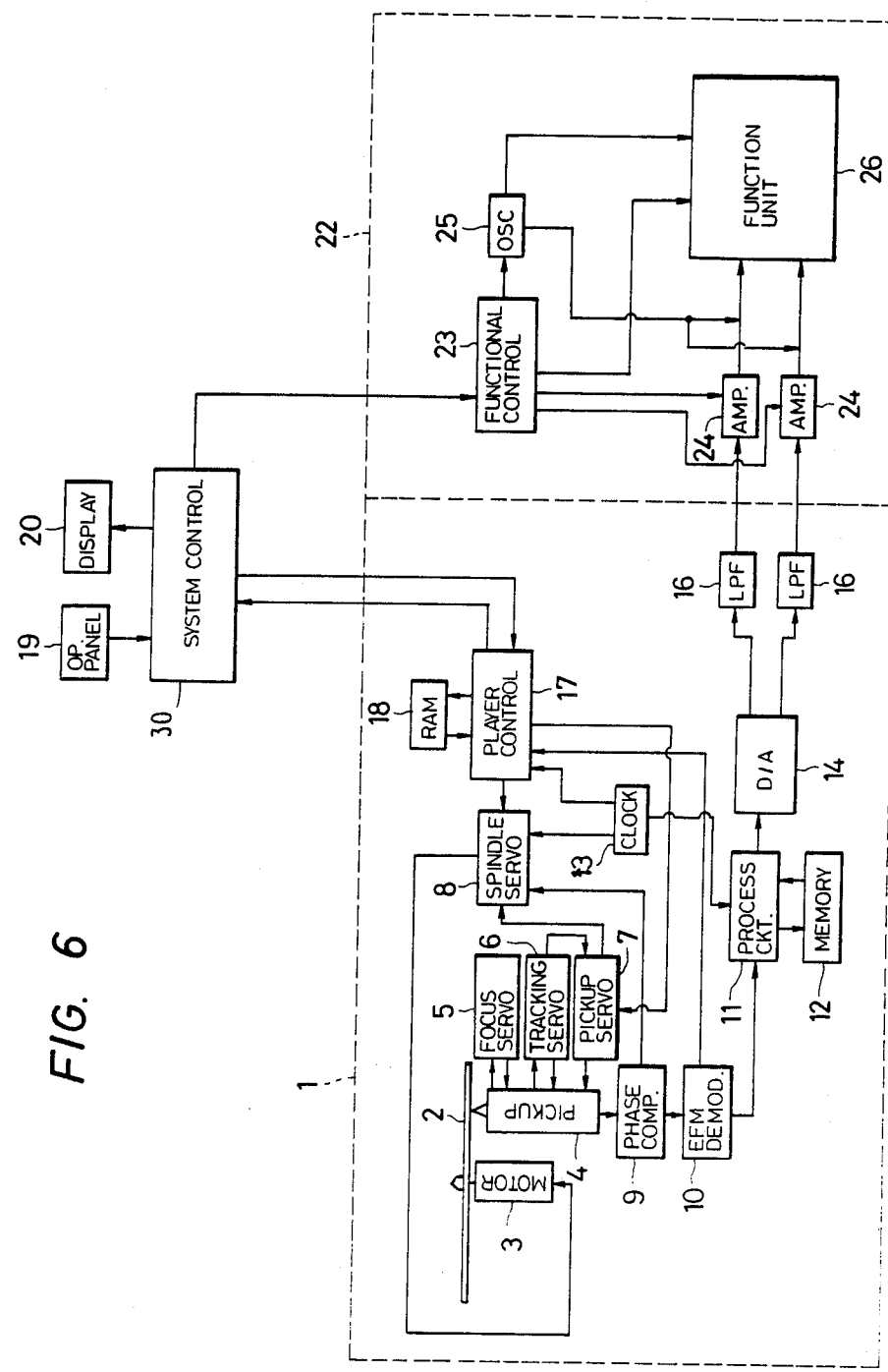
FIG. 6 is a block diagram of another apparatus that can be used to reproduce information from a digital audio disk by the method of the present invention.

FIG. 6 is a block diagram of another embodiment of the invention. A player 1 reproduces the information recorded in a digital audio disk 2. The player 1 corresponds closely to the player of FIG. 2 and like referenced elements not otherwise described perform similar functions and will not be further described.

A player controller 17 corresponds to the system controller of FIG. 2 but is in turn supplied with commands from an overall system controller 30. The player controller supplies the system controller 30 with data indicating the information recorded on the disk and its state of operation.

Like the player controller 17, the system controller 30 is composed of one or more units of microcomputers and supplies commands and other instruction to the player controller 17, the display 20 and a function control circuit 23 in a deck 22 in response to keying-in on the operating panel 19 and output data from the player controller 17.

The audio signals are input from the player 1 into the deck 22 and are passed through respective recording amplifiers 24 to be fed to a recording head in a function unit 26 after being biased with an oscillator circuit 25.

Figure 7:
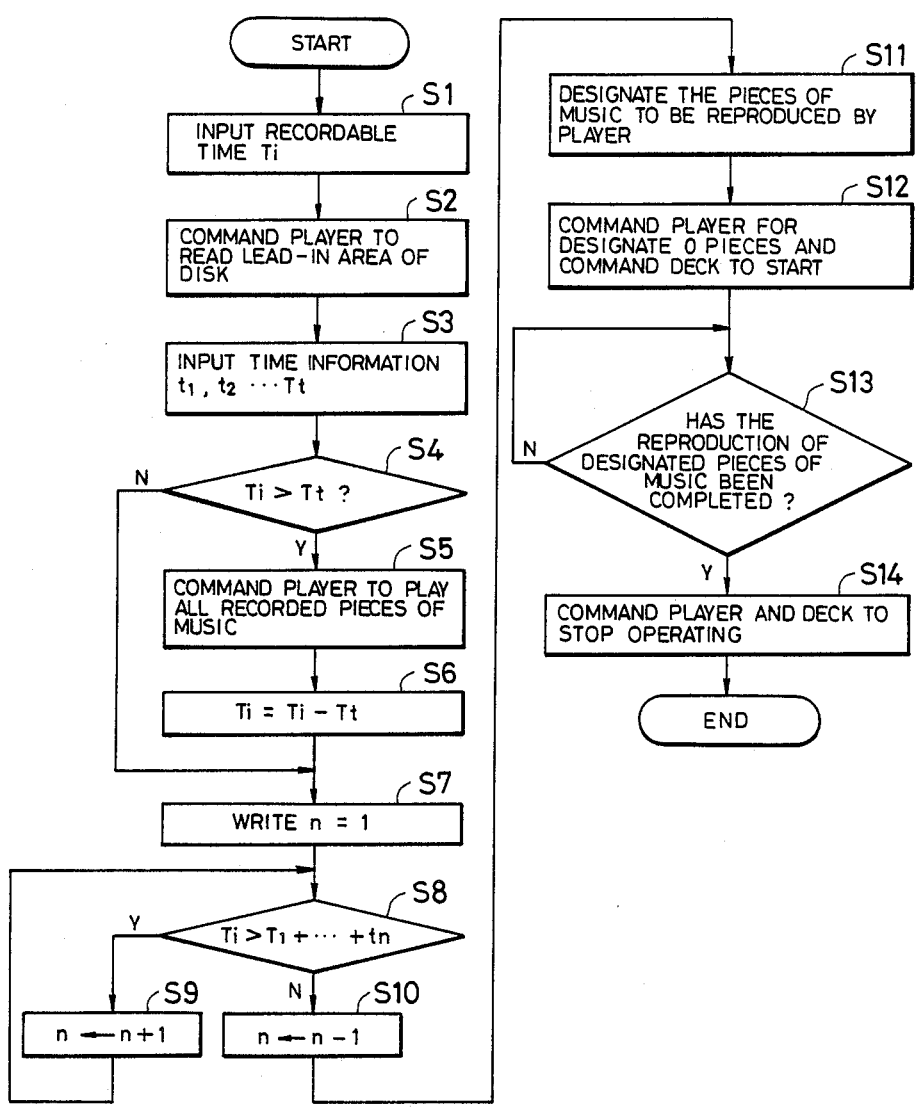
FIG. 7 is a flowchart showing the sequence of operating the apparatus of FIG. 6.

The processor in the microcomputer(s) of which the system controller 30 is composed is operated in accordance with a program stored in a ROM (read-only memory) and performs the following sequence of processing, as illustrated in the flow chart of FIG. 7.

If, during execution of a main routine, the processor is supplied with a dubbing start command that the user keys in on the operating panel 19, the processor reads in data that indicates the tape length, or recordable time, $T_i$ which which is generated by suitable means such as keying-in on the operation panel 19 subsequent to the issuance of that dubbing start command (step S1). The processor then supplies the player controller 17 with a command for reproducing information from the lead-in area of the disk 2. As a result, the processor reads in both data that indicates playing times $t_1$, $t_2$, ... which are individually required to reproduce the separate pieces of recorded music and also data that indicates the total playing time $T_t$ which is required to reproduce all of the pieces of recorded music (steps S2 and S3). The processor compares $T_t$ with $T_i$ (step S4) and issues a command for reproducing all of the pieces of music recorded on the disk 2 if the recordable time $T_i$ is greater than the total playing time $T_t$ (step S5). The processor then subtracts $T_t$ from $T_i$ (S6 in FIG. 2) and writes 1 (one) into a RAM at a predetermined address as data that indicates a number n of pieces of music (S7 in FIG. 2). If, as a result of execution of step S4, it is found that $T_i$ is equal to or smaller than $T_t$, i.e., there is insufficient recorded time, the processor immediately goes to step S7.

In a subsequent step, the processor calculates a partial total playing time $T_n$ which is the total of the playing times of the first to n-th pieces of music ($t_1$, $t_2$, ... $t_n$) for the current value of n. The processor compares the partial total playing time $T_n$ to the recordable time $T_i$ (step S8). If $T_n$ is equal to or smaller than $T_i$, the processor adds 1 (one) to n (the number of pieces of music) and again executes step S8 (step S9). If $T_n$ is greater than $T_i$, the processor subtracts 1 (one) from n (step S10). The value of n which is finally determined is the number n of pieces which can be recorded within the recordable time $T_n$. The processor then feeds the controller 17 in the player 1 with data that designates the first to n-th pieces of music (step S11 in FIG. 2). The processor then feeds the player controller 17 with a command for starting to reproduce the designated pieces of music and, at the same time, the processor sends a record start command to the control circuit 23 in the deck 22 (step S12 in FIG. 2). In the next step, the processor checks to see if the player 1 has reproduced all of the designated pieces of music. If the result is affirmative, the processor sends an operation stop command to the player controller 17 in the player 1 and to the control circuit 23 in the deck 22 (steps S13 and S14).

In the embodiment described above, the system controller 30 sends a variety of commands to the control circuit 23 so as to perform control over the deck 22 but this control of the deck 23 by the system controller 30 is not completely necessary. Another feature of the embodiment described above is that a combination of pieces of music to be reproduced is set in such a manner that $T_n$, or the total of the playing times of the first to n-th pieces of music recorded in the disk 2, will not exceed the recordable time $T_i$. Alternatively, the pieces of music to be reproduced may be combined in such a selection that $T_n$ for that selection is smaller than $T_i$ but also is closer to $T_i$ than any other selection.

As described above, according to the digital audio disk reproducing method of the second embodiment present invention, time information that indicates the time required to reproduce the pieces of information recorded in a digital audio disk is first read to detect the time required to reproduce each piece of recorded information, then an arithmetic operation is performed on the detected time to detect the pieces of information that can be reproduced within a pre-designated period of time, and the so detected pieces of information are successively reproduced. By employing this operational sequence, the method of the present invention achieves automatic dubbing of recorded information in magnetic tape in a satisfactory manner without causing any interrupted music or prolonged blank period at the end of the tape.

What is claimed is:

1. A digital disk player for a disk having recorded thereon a plurality of information sections, and having recorded thereon the time duration for playback of each of said information sections, said digital disk player comprising:

means for storing a predetermined playing time;

means for reading and storing the time duration of each information section of a disk;

means for successively summing the time durations of a first information section to be reproduced and each successive information section to be reproduced until the total time duration of the successively summed time durations first exceeds said pedetermined playing time, the information section whose time duration caused said summed time duration to first exceed said predetermined playing time being termed the first overflow information section;

means for storing an indication of said first and each successive information section up to but not including said first overflow information section to designate a program for playing; and means, responsive to said stored program, for causing playback of the information sections constituting the program for playing.

2. A digital disk player for a disk having recorded thereon a plurality of information sections, and having recorded thereon the time duration for playback of each of said information sections, said player including dubbing means for facilitating the recording of said information sections on another recording medium on which information may be recorded for a first predetermined period of time, said dubbing means comprising:

means for storing the first predetermined recordable time of said recording medium;

means for reading and storing the time duration of each information section of a disk;

means for successively summing the time durations of a first information section to be recorded and each successive information section to be recorded until the total time duration of the successively summed time durations first exceeds said predetermined recordable time of said recording medium, the information section whose time duration caused said summed time duration to first exceed said first predetermined recordable time being termed the first overflow information section;

means for storing an indication of said first and each successive information section up to but not including said first overflow information section to designate a program for recording onto said recording medium; and means, responsive to said stored program, for causing playback of the information sections constituting the program for recording.

3. The digital disk player according to claim 2, wherein the disk is an audio disk.

4. The digital disk player according to claim 3, wherein said recording medium is a magnetic audio tape.

5. The digital player according to claim 4, further comprising a tape deck for dubbing said information sections of the audio disk onto said magnetic audio tape.

6. The digital disk player according to claim 2, further comprising:

means for determining whether said first and each successive information section to be recorded is the last information section recorded on the disk; and means for inhibiting said successively summing means such that the last indicated information section stored in the program is the information section directly preceding said first overflow information section or the last information section recorded on the disk.

7. The digital disk player according to claim 2, further comprising:

means for determining whether the last indicated information section stored in the program is the last information section recorded on the disk; and means, responsive to a determination that the last information section stored in the program is not the last information section recorded on the disk, for storing a pause information section for stopping the playback of information sections, said pause information section being stored after the last information section of the stored program, and being included in the stored program for recording.

8. The digital disk player according to claim 7, further comprising:

means for successively summing the time durations of said first overflow information section and each successive information section to be recorded until the total time duration of the successively summed time durations beginning with said first overflow section first exceeds a second predetermined recordable time of said recording medium, the information section whose time duration caused said summed time duration beginning with said first overflow information section to first exceed said second predetermined recordable time being termed the second overflow information section;

means for storing, after said stored pause information section, an indication of said first overflow information section and each successive information section up to but not including said second overflow information section, said first overflow information section and each successive information section up to but not including said second overflow information section being included in the stored program for recording.

9. The digital disk player according to claim 8, further comprising:

means for determining whether said first overflow information section and each successive information section is the last information section recorded on the disk; and means for inhibiting said means for successively summing the time durations of said overflow information section and each successive information section to be recorded such that the last indicated information section stored in the program for recording is the information section directly preceding said second overflow information section or the last information section recorded on the disk.

10. The digital disk player according to claim 8, further comprising:
means for deleting said stored pause information section from the program for recording only if the time duration of said first overflow information section exceeds said second predetermined period of time.

11. The digital disk player for a disk having recorded thereon a plurality of information sections, and having recorded thereon the time duration for playback of each of said information sections, said player comprising:
means for storing a predetermined playing time;
means for reading and storing the time duratin of each information section of the disk;
means for summing the time duration of each information section recorded on the disk, thereby calculating a total playback time of all of the information sections recorded on the disk;
means for comparing the total playback time with the predetermined playing time;
means, operable only when the summed time duration is not greater than said predetermined playing time, for storing an indication of each of said information sections recorded on the disk to designate a first sequence of information instructions;
means, responsive to said stored first sequence of information sections, for subtracting the predetermined playing time from the total playback time, thereby calculating a remaining playing time;
means for storing said remaining playing time;
means, responsive to said stored remaining playing time, for successively summing the time durations of a first information section to be played and each successive information to be played until the total time duration of the successively summed time durations first exceeds said remaining playing time, the information section whose time duration caused said total time duration to first exceed said remaining playing time being termed the first overflow information section;
means, operable only after said first overflow information section causes said total time duration to exceed said remaining playing time, for storing an indication of the first information section and each successive information section up to but not including said first overflow information section to designate a second sequence of information sections, said first and second sequences of information sections defining a first program for playing;
means, operable only when the total playback time is greater than said predetermined playing time, for successively summing the time durations of the first information section to be played and each successive information section to be played until the total time duration of the successively summed time durations first exceeds said predetermined playing time, the information section whose time duration caused said total time duration to first exceed said predetermined playing time being termed the second overflow information section;
means, operable only after said second overflow information section causes the total time duration to first exceed said predetermined playing time, for storing an indication of said first and each successive information section up to but not including said second overflow information section to designate a second program for playing; and
means, responsive to each of said first and second stored programs, for causing playback of the information sections constituting one of said first and second programs for recording.

12. The digital disk player for a disk having recorded thereon a plurality of information sections, and having recorded thereon the time duration for playback of each of said information sections, said player including dubbing means for facilitating the recording of said information sections on another recording medium on which information may be recorded for a predetermined period of time, said dubbing means comprising:
means for storing the predetermined recordable time of said recording medium;
means for reading and storing the time duration of each information section of the disk;
means for summing the time duration of each information section recorded on the disk, thereby calculating a total playback time of all of the information sections recorded on the disk;
means for comparing the total playback time with the predetermined recordable time of said recording medium;
means, operable only when the summed time duration is not greater than said predetermined recordable time, for storing an indication of each of said information sections recorded on the disk to designate a first sequence of information instructions;
means, responsive to said stored first sequence of information sections, for subtracting the predetermined recordable time from the total playback time, thereby calculating a remaining recordable time of said recording medium;
means for storing said remaining recordable time;
means, responsive to said stored remaining recordable time, for successively summing the time durations of a first information section to be recorded and each successive information to be recorded until the total time duration of the successively summed time durations first exceeds said remaining recordable time of said recording medium, the information section whose time duration caused said total time duration to first exceed said remaining recordable time being termed the first overflow information section;
means, operable only after said first overflow information section causes said total time duration to exceed said remaining recordable time, for storing an indication of the first information section and each successive information section up to but not including said first overflow information section to designate a second sequence of information sections, said first and second sequences of information sections defining a first program for recording;
means, operable only when the total playback time is greater than said predetermined recordable time, for successively summing the time durations of the first information section to be played and each successive information section to be recorded until the total time duration of the successively summed time durations first exceeds said predetermined recordable time of said recording medium, the information section whose time duration caused said total time duration to first exceed said predetermined recordable time being termed the second overflow information section;

means, operable only after said second overflow information section causes the total time duration to first exceed said predetermined recordable time, for storing an indication of said first and each successive information section up to but not including said second overflow information section to designate a second program for recording onto said recording medium; and means, responsive to each of said first and second stored programs, for causing playback of the information sections constituting one of said first and second programs for recording.

13. The digital disk player according to claim 12, wherein the disk is an audio disk, and wherein said recording medium is a magnetic audio tape.

14. The digital disk player according to claim 12, further comprising a tape deck for dubbing said information sections of the audio disk onto said magnetic audio tape.

15. A method of playing information sections of a disk having recorded thereon a plurality of said information sections, and having recorded thereon the time duration for playback of each of said information sections, the method comprising the steps of:

storing a first predetermined playing period of time;

reading and storing the time duration of each information section of the disk;

successively summing the time durations of a first information section to be played and each successive information section to be played until the total time duration of the successively summed time durations first exceeds said first predetermined playing time, the information section whose time duration caused said summed time duration to first exceed said first predetermined playing time being termed the first overflow information section;

storing an indication of said first and each successive information section up to but not including said first overflow information section to designate a program for playing; and playing back, in response to said stored program, the information sections constituting the program for playing.

16. A method of recording information sections of a disk onto another recording medium having a first predetermined recordable period of time in which information may be recorded thereon, the disk having recorded thereon a plurality of said information sections, and having recorded thereon the time duration for playback of each of said information sections, the method comprising the steps of:

storing the first predetermined recordable period of time of said recording medium;

reading and storing the time duration of each information section of the disk;

successively summing the time durations of a first information section to be recorded and each successive information section to be recorded until the total time duration of the successively summed time durations first exceeds said first predetermined recordable time of said recording medium, the information section whose time duration caused said summed time duration to first exceed said first predetermined recordable time being termed the first overflow information section;

storing an indication of said first and each successive information section up to but not including said first overflow information section to designate a program for recording onto said recording medium; and playing back, in response to said stored program, the information sections constituting the program for recording.

17. The method of recording information sections according to claim 16, further comprising the steps of:

determining whether said first and each successive information section to be recorded is the last information section recorded on the disk; and stopping said step of successively summing such that the last indicated information section stored in the program is the information section directly preceding the overflow information section or the last information section recorded on the disk.

18. The method of recording information sections according to claim 16, further comprising the steps of:

determining whether the last indicated information section stored in the program is the last information section recorded on the disk; and storing, in response to a determination that the last information section stored in the program is not the last information section recorded on the disk, a pause information section for stopping the playback of information sections, said pause information section being stored after the last information section of the stored program, and being included in the stored program for recording.

19. The method of recording information sections according to claim 18, further comprising the steps of:

successively summing the time durations of said first overflow information section and each successive information section to be recorded until the total time duration of the successively summed time durations beginning with said first overflow section first exceeds a second predetermined recordable time of said recording medium, the information section whose time duration caused said total time duration beginning with said first overflow information section to first exceed said second predetermined recordable time being termed the second overflow information section;

storing, after said pause information section, an indication of said first overflow information section and each successive information section up to but not including said second overflow information section, said first overflow information section and each successive information section up to but not including said second overflow section being included in the stored program for recording.

20. The method of recording information sections according to claim 19, further comprising the steps of:

determining whether said first overflow information section and each successive information section is the last information section recorded on the disk; and stopping said step of successively summing the time durations of said first overflow information section and each successive information section stored in the program for recording is the information section directly preceding said second overflow information section or the last information section recorded on the disk.

21. The method of recording information sections according to claim 19, further comprising the step of:

deleting said pause information section from said program for recording only if the time duration of said first overflow information section exceeds said second predetermined period of time.

22. A method of playing information sections of a disk, the disk having recorded thereon a plurality of said information sections, and having recorded thereon the time duration for playback of each of said information sections, the method comprising the steps of:

storing the predetermined playing time of said recording medium;

reading and storing the time duration of each information section of the disk;

summing the time duration of each information section recorded on the disk, thereby calculating a total playback time of all of the information sections recorded on the disk;

comparing the total playback time with a predetermined playing time;

storing, only when the total playback time is not greater than said predetermined playing time, an indication of each of said information sections recorded on the disk to designate a first sequence of information instructions;

subtracting, in responsive to said stored first sequence of information sections, the predetermined playing time from the total playback time, thereby calculating a remaining playing time;

storing the remaining playing time;

successively summing, in response to the stored remaining playing time, the time durations of the first information section to be played and each successive information to be played until the total time duration of the successively summed time durations first exceeds said remaining playing time, the information section whose time duration caused said summed time duration to first exceed said remaining playing time being termed the first overflow information section;

storing, only after said first overflow information section causes said summed time duration to first exceed said remaining playing time, an indication of the first information section and each successive information section up to but not including said first overflow information section to designate a second sequence of information sections, said first and second sequences of information sections defining a first program for recording;

successively summing, only when the total playback time is greater than said predetermined playing time, the time durations of the first information to be played and each successive information section to be played until the total time duration of the successively summed time durations first exceeds said predetermined playing time, the information section whose time duration caused said total time duration to first exceed said predetermined playing time being termed the second overflow information section;

storing, only after said second overflow information section causes the successively summed time durations to first exceed said predetermined playing time, an indication of said first and each successive information section up to but not including said second overflow information section to designate a second program for playing; and playing back, in responsive to each of said first and second stored programs, the information sections constituting one of said first and second programs for playing.

23. A method of recording information sections of a disk onto another recording medium having a predetermined recordable period of time in which information may be recorded thereon, the disk having recorded thereon a plurality of said information sections, and having recorded thereon the time duration for playback of each of said information sections, the method comprising the steps of:

storing the predetermined recordable time of said recording medium;

reading and storing the time duration of each information section of the disk;

summing the time duration of each information section recorded on the disk, thereby calculating a total playback time of all of the information sections recorded on the disk;

comparing the total playback time with the predetermined recordable time of said recording medium;

storing, only when the total playback time is not greater than said predetermined recordable time, an indication of each of said information sections recorded on the disk to designate a first sequence of information instructions;

subtracting, in responsive to said stored first sequence of information sections, the predetermined time from the total playback time, thereby calculating a remaining recordable time of said recording medium;

storing the remaining recordable time of said recording medium;

successively summing, in response to the stored remaining recordable time of said recording medium, the time durations of the first information section to be recorded and each successive information to be recorded until the total time duration of the successively summed time durations first exceeds said remaining recordable time of said recording medium, the information section whose time duration caused said summed time duration to first exceed said remaining recordable time being termed the first overflow information section;

storing, only after said first overflow information section causes said summed time duration to first exceed said remaining recordable time, an indication of the first information section and each successive information section up to but not including said first overflow information section to designate a second sequence of information sections, said first and second sequences of information sections defining a first program for recording;

successively summing, only when the total playback time is greater than said predetermined recordable time, the time durations of the first information to be recorded and each successive information section to be recorded until the total time duration of the successively summed time durations first exceeds said predetermined recordable time of said recording medium, the information section whose time duration caused said total time duration to first exceed said predetermined recordable time being termed the second overflow information section;

storing, only after said second overflow information section causes the successively summed time durations to first exceed said predetermined recordable time, an indication of said first and each successive information section up to but not including said second overflow information section to designate a second program for recording ono said recording medium; and playing back, in responsive to each of said first and second stored programs, the information sections constituting one of said first and second programs for recording.

* * * * *